United States Patent [19]

Woolley

[11] 3,801,983
[45] Apr. 2, 1974

[54] RADAR RECEIVER NOISE RATIO DETECTOR

[75] Inventor: Richard L. Woolley, Canoga Park, Calif.

[73] Assignee: The United States of America as represented by the Secretary of the Navy, Washington, D.C.

[22] Filed: Apr. 24, 1972

[21] Appl. No.: 247,126

[52] U.S. Cl............................ 343/16 M, 343/113 R
[51] Int. Cl............................................... G01s 9/22
[58] Field of Search ....................... 343/16 M, 113 R

[56] References Cited
UNITED STATES PATENTS

| 2,817,835 | 12/1957 | Worthington, Jr. | 343/16 M |
|---|---|---|---|
| 3,181,160 | 4/1965 | Pichafroy | 343/16 M |
| 3,283,323 | 11/1966 | Kirkpatrick | 343/16 M |
| 2,831,969 | 4/1958 | Jankowski | 343/16 M |
| 2,467,361 | 4/1949 | Blewett | 343/16 M |
| 3,050,724 | 8/1962 | Stillwell | 343/16 M |
| 3,177,489 | 4/1965 | Saltzberg | 343/113 R |

Primary Examiner—Maynard R. Wilbur
Assistant Examiner—G. E. Montone
Attorney, Agent, or Firm—R. S. Sciascia; Charles D. B. Curry

[57] ABSTRACT

A ratio detector circuit which distinguishes between signal-plus-noise input and noise-only input to a radar monopulse receiver. The ratio detector circuitry provides this function for both narrow-band sine wave signals and wide-band contours spectrum signals from source signals within the receiving antenna beamwidth.

6 Claims, 3 Drawing Figures

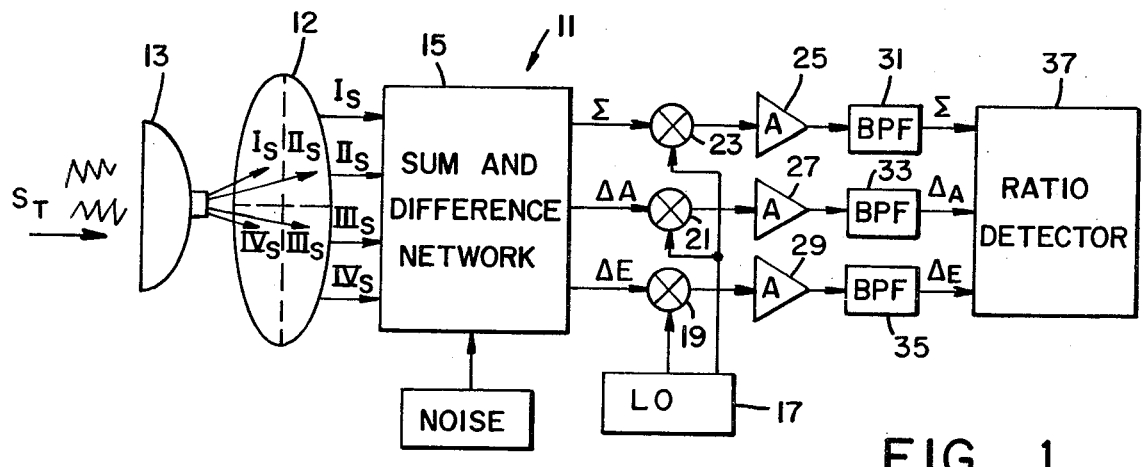
FIG_1
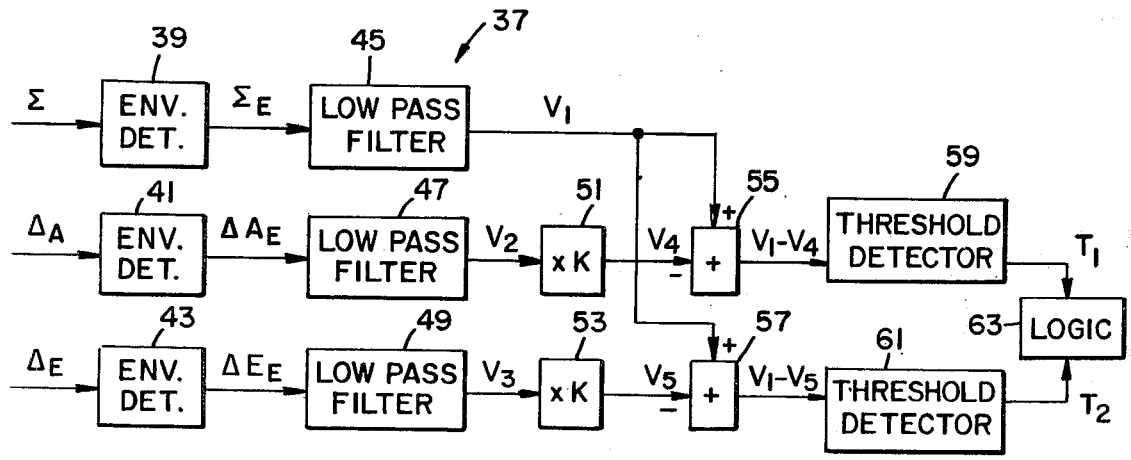
FIG_2
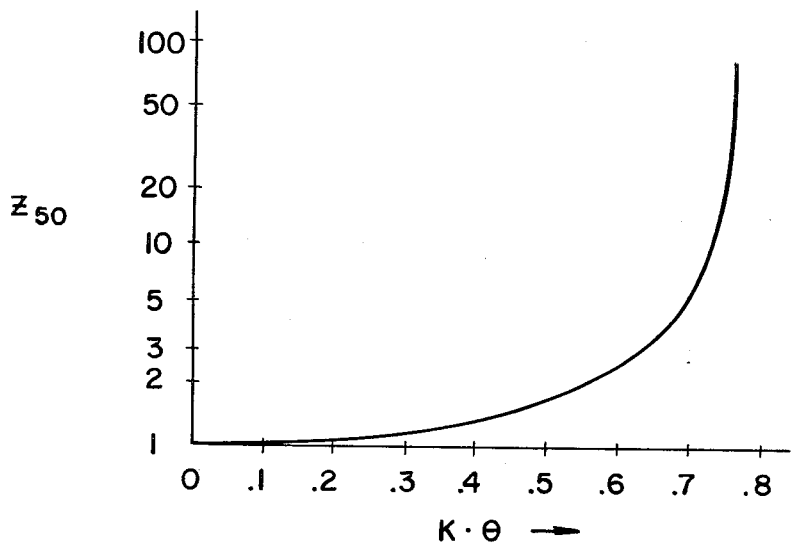
FIG_3

RADAR RECEIVER NOISE RATIO DETECTOR

BACKGROUND OF THE INVENTION

1. Field of the Invention

The present invention relates generally to a radar receiver noise ratio detector and more particularly to a ratio detector which distinguishes between signal-plus-noise input and noise-only input to a radar monopulse receiver.

2. Description of the Prior Art

Detection of narrow-band signals are currently provided by many different types of detectors operating on the sum channel signal from the monopulse antenna systems. For example, a mean level detector is used to detect instantaneous signal levels as compared to long-term time average. Another type of detector is an ensemble detector which detects the signal level in narrow bandwidths as compared to the average level over a wide bandwidth.

Detection of wideband signals is generally provided by use of radiometry systems wherein the noise density input may be compared to a fixed reference or a time average level. In the aforementioned systems the sensitivity is dependent on the signal bandwidth. The above systems have many sidelobe targets. Finally, the detection sensitivity is dependent on the absolute value of the receiver noise level.

SUMMARY OF THE INVENTION

Briefly, the present invention is a ratio detector circuit which distinguishes between signal-plus-noise input and noise-only input to a radar monopulse receiver. The ratio detector circuitry provides this function for both narrow-band sine wave signals and wideband contours spectrum signals from source signals within the receiving antenna beamwidth.

The present invention overcomes the aforementioned problems in that the detection sensitivity is independent of the signal bandwidth. The circuit detection sensitivity decreases with increasing angles between the line-of-sight to the signal source and the receiving antenna boresight, thus providing an "angle gate" function to eliminate many sidelobe targets. Finally, the detection sensitivity is independent of the absolute value of the receiver noise level, and only a function of the relative gains stability of the sum and difference channels in the radar receiver.

STATEMENTS OF THE OBJECTS OF INVENTION

A primary object of the present invention is to provide a radar receiver noise ratio detector with a detection sensitivity independent of the signal bandwidth.

Another object of the present invention is to provide a radar receiver noise ratio detector with a detection sensitivity which decreases with increasing angles between the line-of-sight to the signal source and the receiving antenna boresight to provide an "angle gate" function to eliminate many of the sidelobe targets.

Another object of the present invention is to provide a radar receiver noise ratio detector with a detection sensitivity which is independent of the absolute value of the receiver noise level and only a function of the relative gain stability of the sum and difference channels in the radar receiver.

Other objects, advantages and novel features of the invention will become apparent from the following detailed description of the invention when considered in conjunction with the accompanying drawings.

BRIEF DESCRIPTION OF THE DRAWINGS

FIG. 1 is a representative embodiment of a conventional radar monopulse receiver modified to include the ratio detector;

FIG. 2 is a schematic diagram of the ratio detector, illustrated in FIG. 1, which is the preferred embodiment of the present invention and;

FIG. 3 is a graphical representation of the value of $Z_{50}$ plotted as a function of fractional modulation index angle of the antenna $K \cdot \theta$.

DESCRIPTION OF THE PREFERRED EMBODIMENT

Referring to FIG. 1, the monopulse antenna system includes a monopulse antenna 13, a sum and difference network 15, local oscillator 17, mixers 19, 21, 23, amplifiers 25, 27, 29, band pass filters 31, 33, 35 and the ratio detector 37. The ratio detector 37 compares with ratio of the detected sum channel signal to the detected difference channel signal with a fixed value from the sources within the receiving antenna beamwidth. When the ratio exceeds the fixed value, a target signal is indicated on a display device.

In FIG. 1, the target signal $S_T$ is sensed by antenna 13 of radar receiver 11. The target signal $S_T$ is received at antenna 13 and processed in the receiver 11. A quadrant output signal from each of the four quadrants $I_s$, $II_s$, $III_s$ and $IV_s$ is generated and applied to the input of the sum and different network 15, depending on the location of the target $S_T$, so that when a signal is present at the input to the monopulse antenna 13 the sum network 15 produces the sum and difference channel signals with the following relations:

Sum channel voltage $= \Sigma$
Azimuth channel voltage $= K\ \theta_A \Sigma = \Delta_A$
Elevation channel voltage $= K\ \theta_E \Sigma = \Delta_E$ where $K$ is the fractional modulation index of the antenna and where:

$\theta_A$ is the azimuth error angle
$\theta_E$ is the elevation error angle

Noise is added to each of the three signals in the sum and difference network 15. The difference channel signals of azimuth $\Delta A$ and elevation $\Delta E$ may be combined, as illustrated in FIG. 1, with the sum channel signal $\Sigma$ using one of any number of well known multiplexing schemes. The type of multiplexing scheme used, if any, will have no effect on the ratio detector 37, except that signals proportional to the original sum and difference signals $\Sigma$, $\Delta A$ and $\Delta E$ must be derived for the detector input. Therefore, we can ignore multiplexing for purposes of this discussion. Moreover, standard radar receiving circuitry may be used except for the ratio detector circuitry 37.

Referring again to FIG. 1, the output sum signal $\Sigma$ of the azimuth $A$ and elevation $E$, from the sum and difference network 15, is applied to the input of mixer 23 while the difference output azimuth signal $\Delta A$ and elevation signal $\Delta E$ from the difference networks of the sum and difference networks 15 is applied to the inputs of mixers 21 and 19, respectively. The output signals from local oscillator 17 are applied as inputs to mixers 19, 21 and 23 to generate outputs, from mixers 19, 21 and 23, at a more convenient radar carrier frequency. The output signals from mixers 19, 21 and 23 are applied to the individual inputs of amplifiers 29, 27 and 25, respectively.

The output signals from amplifiers 25, 27, 29 are applied to the inputs of band pass filters 31, 33, 35, respectively. These band pass filters 31, 33 and 35 have a single transmission band, neither of the cut-off frequencies being zero or infinite. The sum signal $\Sigma$ and the difference signals of azimuth $\Delta A$ and elevation $\Delta E$ are applied to the respective inputs of ratio detector 37.

Referring to FIG. 2, the band pass filtered sum signal $\Sigma$ of the azimuth signal $A$ and elevation signal $E$, hereinafter referred to as sum signal $\Sigma$, and difference signal of the azimuth signal $\Delta A$ and the elevation signal $\Delta E$ are individually envelope detected in envelope detectors 39, 41, 43. The output of the envelope sum signal $\Sigma$ of $A$ and $E$ and the enveloped detected azimuth difference signal $\Delta A$ and the elevation difference signal $\Delta E$ are applied to the input of low pass filters 45, 47 and 49, respectively. The envelope detectors 45, 47 and 49 are standard linear detectors or the like. The output of envelope detectors 45, 47 and 49 are proportional to the characteristic of the input signals. The output signals from low pass filters 45, 47 and 49 form output signals $V_1$, $V_2$ and $V_3$, respectively. Low pass filters 45, 47 and 49 form a single transmission band extending from zero frequency up to cut-off frequency. The detected and filtered difference signals $V_2$ and $V_3$ are each multiplied in multipliers 51 and 53, respectively, by the factor $K_T$ described below, to form signals $V_4$ and $V_5$, respectively. The resulting signals, where $K_T V_2$ equals $V_4$ and $K_T V_3$ equals $V_5$, are individually subtracted from the $V_1$ output signal, in adders 55 and 57, and the output signals of $V_1 - V_4$ and $V_1 - V_5$ are applied to standard threshold detectors 59 and 61, respectively.

The output threshold signals $T_1$ and $T_2$ are applied to logic circuit 63. When the difference signals reach a positive value, the threshold is crossed. When the ratio exceeds the fixed value, a received target is indicated. One or both ratios may be threshold. The individual threshold detector outputs $T_1$ and $T_2$ from threshold detectors 59 and 61 are combined in the logic circuit 63 to indicate the presence of a target signal $S_T$ received at the antenna 13 input. The basic threshold conditions are $$V_1 - K_T V_2 \geq 0 \text{ for } T_1 = 1$$

and;

$$V_1 - K_T V_3 \geq 0 \text{ for } T_2 = 1$$

The value of $K_T$ being set so that the probability that $V_1 - K_T V_2 \geq 0$ or $V_1 - K_T V_3 \geq 0$ for no signal input, receiver noise only, is equal to the allowable probability of a false alarm.

The following example is an embodiment of the present invention which has been found to be satisfactory and is given to illustrate the operation of the ratio detector. Assume the following numerical parameters:

$B = 1,000$ Hz = bandpass filter bandwidth
$\tau = 50$ milliseconds = low pass filter time constant
$P_{FA} = 10 = $ probability of false alarm on receiver noise input for either $T_1$ or $T_2$ Assuming equal and uniform Guassian noise density for each of the three signals inputs to the ratio detector, let the noise power input to each of the three envelope detectors be $\omega_0 b = o_N^2$. For the parameters listed, the probability density function of each of $V_1$, $V_2$ and $V_3$ may be considered Guassian with the following parameters:

Mean = $\mu_o = a\ \sigma_N$
Variance = $\sigma_o^2 = b\sigma_N^2$
where $\sigma_o \cong 0.523 \mu_o / \sqrt{2\tau B} = 0.0523 \mu_o$ and where $\sigma$ is the standard deviation of a predefined population; $a$ and $b$ are proportionately constants related to the envelope detector. The outputs of the two difference circuits each have Guassian probability density functions with the parameters.

Mean = $\mu = \mu_o(1 - K_T)$
Variance = $\sigma^2 = \sigma_o^2(1 + K_T^2)$
Denoting $V$ as the output of either difference circuit, $$P_{FA} = 10^{-4} = \int_0^\infty p(V) dV$$
$$= \int_0^\infty \frac{1}{\sqrt{2\pi\sigma^2}} \exp\left[-\tfrac{1}{2}\left(\frac{V-\mu}{\sigma}\right)^2\right] dV$$
$$= \int_{-\frac{\sigma}{\mu}}^\infty \frac{1}{\sqrt{2\pi}} e^{-t^2/2} dt$$

The probability of false alarm is achieved when $\mu = -3.7\ \sigma$ $$\therefore \mu_o(1 - K_T) = -3.7\ \sigma_o\ \sqrt{1 + K_T^2}$$

Solving for $K_T$ using the above expressions: $K_T = 1.323$
Since the mean voltage output for $V_1$, $V_2$ or $V_3$ is proportional to the total power inputs to the envelope detector, the signal-to-noise ratio required to give 50 percent probability of detection is easily derived.

$$\mu 1 = a\ \sqrt{S^2 + \sigma_N^2}$$
$$\mu 2 = a\ \sqrt{k^2\ \theta_A^2\ S^2 + \sigma_N^2}$$
$$\mu 3 = a\ \sqrt{k^2\ \theta_E^2\ S^2 + \sigma_N^2} \text{ letting } S^2/\sigma_N^2 = Z =$$

signal-to-noise at the envelope detector input:

$$\mu 1 = a\ \sigma_N\ \sqrt{1 + Z}$$
$$\mu 2 = a\ \sigma_N\ \sqrt{1 + Z\ k^2\ \theta_A^2}$$
$$\mu 3 = a\ \sigma_N\ \sqrt{1 + Z\ k^2\ \theta_E^2}$$

The threshold condition is satisfied when $$\mu 1 = 1.323\ \mu_2 \text{ or } \mu_1 = 1.323 \mu_3$$

Substituting and solving for $Z$ to give 50 percent probability of detection:

$$Z_{50} = 0.75/(1 - 1.75\ K^2\ \theta_A^2) = 0.75/(1 - 1.75\ K^2\ \theta_E^2)$$

The value of $Z_{50}$, illustrated in FIG. 3, is plotted as a function of $k \cdot \theta$ in the following figure. $Z_{50}$ is independent of the bandwidth of the signal causing the change in the relative power levels at the envelope detector inputs.

What is claimed is:

1. A ratio detector to discriminate between signal-plus noise input and noise-only input to a radar receiver said receiver including a sum, a difference signal generating means which generates an asimuth difference signal, an elevation difference signal and a summation signal of the asimuth and elevation signal, said detector comprising in combination:

a. a first envelope detector;
b. a second envelope detector;
c. a third envelope detector wherein said summation signal is applied to the input of said first envelope detector; said asimuth signal is applied to said second envelope detector and said elevation signal is applied to said third envelope detector;
d. said first envelope detector generating an output signal to the input of a first low pass filtering means;
e. said second envelope detector generating an output signal to the input of a second low pass filtering means;
f. said third envelope detector generating an output signal to the low pass filtering means wherein the output signal from said first filter is applied to a first adding means and a second adding means wherein the output signal from a said second filter is applied to a first multiplication apparatus and the output of said third filter is applied to a second multiplication apparatus;
g. said first multiplication apparatus generating an output signal which is applied to an input of said first adding means;
h. said second multiplication apparatus generating an output signal from said second multiplication apparatus;
i. said first adding means subtracting said first multiplication apparatus output signal from the first low pass filter output signal to generate a first remainder output signal from said first adding means; and
j. said second adding means subtracting said second multiplication apparatus output signal from the first low pass filter output signal to generate a second remainder output signal from said second adding means.

2. The device recited in claim 1 wherein said first remainder output signal is applied to the input of a first threshold detector wherein said second remainder input signal is applied to the input of a second threshold detector.

3. The device recited in claim 2 wherein the output signal from said first threshold and the output signal from said second threshold detector is applied to the input of a logic circuit.

4. The device recited in claim 1 wherein said first, second and third envelope detectors are linear detectors.

5. The device recited in claim 1 wherein said summation signals, said azimuth difference signals and said elevation difference signals are band passed filtered.

6. The device recited in claim 1 wherein said first multiplication apparatus and second multiplication apparatus multiplies the second low pass filter output signal and the third low pass filter output signal by a threshold factor (ratio) determined by the allowable probability of false alarm.

* * * * *